US010117106B2

(12) United States Patent
Barriac et al.

(10) Patent No.: US 10,117,106 B2
(45) Date of Patent: Oct. 30, 2018

(54) BACKOFF MECHANISM TECHNIQUES FOR SPATIAL REUSE

(71) Applicant: QUALCOMM Incorporated, San Diego, CA (US)

(72) Inventors: Gwendolyn Denise Barriac, Encinitas, CA (US); Simone Merlin, San Diego, CA (US); George Cherian, San Diego, CA (US); Alfred Asterjadhi, San Diego, CA (US); Yan Zhou, San Diego, CA (US); Gang Ding, San Diego, CA (US); Qingjiang Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 15/239,619

(22) Filed: Aug. 17, 2016

(65) Prior Publication Data

US 2017/0055160 A1 Feb. 23, 2017

Related U.S. Application Data

(60) Provisional application No. 62/207,790, filed on Aug. 20, 2015.

(51) Int. Cl.
*H04W 74/08* (2009.01)
*H04W 16/14* (2009.01)

(52) U.S. Cl.
CPC ....... *H04W 16/14* (2013.01); *H04W 74/0808* (2013.01); *H04W 74/0816* (2013.01)

(58) Field of Classification Search
CPC ............. H04W 16/14; H04W 74/0808; H04W 74/0816

(Continued)

(56) References Cited

U.S. PATENT DOCUMENTS

2007/0165665 A1 7/2007 Gaur et al.
2014/0071821 A1* 3/2014 Fang ............... H04W 24/00
370/230

(Continued)

FOREIGN PATENT DOCUMENTS

WO WO-2014/190275 A1 11/2014
WO WO-2016/081181 A1 5/2016

OTHER PUBLICATIONS

International Search Report and Written Opinion—PCT/US2016/047587—ISA/EPO—dated Oct. 31, 2016. (14 total pages).

(Continued)

*Primary Examiner* — Obaidul Huq
(74) *Attorney, Agent, or Firm* — Arent Fox, LLP and Qualcomm, Incorporated

(57) ABSTRACT

Techniques for reducing delay in scheduling traffic transmission in an overlapping basic service set (OBSS) environment by modifying backoff mechanisms are disclosed. In some examples, a device (e.g., station (STA), access point (AP)) decodes at least a portion of a preamble of a packet to determine whether the packet is sent by a member of an OBSS (e.g., STA, AP from a different BSS). Backoff operations are typically deferred as a result of the decoding. Aspects of the present disclosure provide a method, apparatus, and system in which the backoff operations are resumed prior to expiration of the period reserved for an OBSS packet by the network allocation vector (NAV). That is, the device may not honor the NAV of the OBSS packet, and instead perform spatial reuse by transmitting another packet (or signal) on the same frequency channel during the NAV of the OBSS packet.

36 Claims, 10 Drawing Sheets

(58) Field of Classification Search
USPC .......................................... 370/310, 328, 329
See application file for complete search history.

(56) References Cited

U.S. PATENT DOCUMENTS

2016/0150534 A1* 5/2016 Kwon ................ H04W 72/0446
370/338
2016/0227441 A1* 8/2016 Park .................. H04W 74/0816

OTHER PUBLICATIONS

Son J (Wilus Institute): "Further Considerations on Enhanced CCA for 11ax, 11-14-0847-01-00ax-further-considerations-on-enhanced-cca-for-11ax," IEEE Draft; 11-14-0847-01-00AX-Further-Considerationson-Enhanced-CCA-For-11AX, IEEE—Sa Mentor, Piscataway, NJ USA, Jul. 15, 2014 (Jul. 15, 2014), vol. 802.11ax, No. 1, pp. 1-12. XP068069563. [retrieved on Jul. 15, 2014].

* cited by examiner

BACKOFF MECHANISM TECHNIQUES FOR SPATIAL REUSE

CLAIM OF PRIORITY UNDER 35 U.S.C. § 120

The present application claims priority to Provisional Application No. 62/207,790 entitled "BACKOFF MECHANISM TECHNIQUES FOR SPATIAL REUSE," and filed Aug. 20, 2015, which is assigned to the assignee hereof and hereby expressly incorporated by reference herein.

BACKGROUND OF THE DISCLOSURE

The present disclosure relates generally to telecommunications, and specifically to backoff mechanism techniques for spatial reuse.

The deployment of wireless local area networks (WLANs) in the home, the office, and various public facilities is commonplace today. Such networks typically employ a wireless access point (AP) that connects a number of wireless stations (STAs) in a specific locality (e.g., home, office, public facility, etc.) to another network, such as the Internet or the like. A set of STAs can communicate with each other through a common AP in what is referred to as a basic service set (BSS). However, when two or more unrelated BSSs are close enough to hear each other and are operating in the same frequency (e.g., in a multi-dwelling setting where there may be multiple APs in a close proximity to one another servicing a number of BSS), the transmissions by some STAs in one BSS may affect the STAs in another BSS. Thus, in some examples, nearby BSSs may have overlapping coverage areas and such BSSs may be referred to as overlapping BSSs or OBSSs.

Some WLAN network deployments may be dense (e.g., have a large number of STAs deployed within the coverage area of multiple APs), which may result in issues related to channel or medium usage. Due to collisions and interference among STAs caused by the overlapping BSSs, channel resources may be unnecessarily wasted. For instance, in some examples, one or more STAs or APs may receive packet(s) from an OBSS that are intended for a different STA or AP. Nonetheless, the receiving STA or AP must expend resources decoding the received packet(s). During the decoding process, the STA and/or AP is generally unable to schedule its own transmission on the wireless channel or medium, or to continue the backoff process necessary to transmit Such delays in scheduling traffic transmission may result in reduced throughput rates experienced by the STA and/or the AP.

SUMMARY

The present disclosure provides various aspects related to techniques for managing wireless communication in an OBSS environment. In some examples, a device (e.g., STA or AP) may receive a packet over a wireless channel, and may subsequently decode at least a portion of a preamble of the packet to determine whether the packet is sent by a member of an OBSS (e.g., STA or AP from a different BSS that that of the device). During the decoding process, a backoff operation (e.g., backoff time period or time interval) may be deferred or paused pending the results of the decoding. In some aspects of the present disclosure, the STA or AP may reduce the delay in transmitting traffic awaiting transmission by resuming the backoff operations as soon as possible in response to a determination that the packet is sent by a member of an OBSS, and that one or more reuse criteria are met. (e.g., received signal strength indication (RSSI) of the packet may be below a threshold).

Specifically, in order to increase reuse of the frequency channel by more than one device (e.g., spatial reuse), aspects of the present disclosure provide a method for dropping packets that are from OBSSs in certain circumstances. For example, if the received packet is determined to be an OBSS packet, and one or more reuse criteria are met (e.g., RSSI of the packet may be below a threshold), the receiving device may ignore a remaining portion of the packet (e.g., packet payload) and resume the backoff operations of the receiving device in order to schedule transmission of other packet(s) awaiting transmission on the frequency channel. In some aspects, the transmission of the packet may occur during the network allocation vector (NAV) of the OBSS packet.

In some aspects of the present disclosure, a method for wireless communication is provided. The method may comprise receiving, at a first device, a packet and decoding at least a portion of a preamble of the packet to determine whether the packet is sent by a member of an OBSS. In some aspects, a backoff operation may be deferred in response to a start of the decoding. The method may further include resuming the backoff operation in response to a determination that the packet is sent by the member of the OBSS, and that reuse of the medium is allowed based on one or more criteria. The backoff operation may be resumed before an end of the packet.

In another aspect, an apparatus for wireless communications is provided. The apparatus may include a processor and a memory coupled to the processor. In some examples, the memory may include instructions executable by the processor to receive, at a first device, a packet and decoding at least a portion of a preamble of the packet to determine whether the packet is sent by a member of an OBSS. In some examples, a backoff operation may be deferred in response to a start of the decoding. The instructions may further be executable by the processor to resume the backoff operation in response to a determination that the packet is sent by the member of the OBSS, and that reuse of the medium is allowed based on one or more criteria. The backoff operation may be resumed before an end of the packet.

In some aspects, another apparatus for wireless communications is provided. The apparatus may include means for receiving, at a first device, a packet and decoding at least a portion of a preamble of the packet to determine whether the packet is sent by a member of an OBSS. In some examples, a backoff operation may be deferred in response to a start of the decoding. The apparatus may further include means for resuming the backoff operation in response to a determination that the packet is sent by the member of the OBSS, and that reuse of the medium is allowed based on one or more criteria. The backoff operation may be resumed before an end of the packet.

In some aspects, a computer readable medium for wireless communications is provided. The computer readable medium may include code for receiving, at a first device, a packet and decoding at least a portion of a preamble of the packet to determine whether the packet is sent by a member of an OBSS. In some examples, a backoff operation may be deferred in response to a start of the decoding. The computer readable medium may further include code for responding to a determination that the packet is sent by the member of the OBSS, and that reuse of the medium is allowed based on one or more criteria. The backoff operation may be resumed before an end of the packet.

It is understood that other aspects of apparatuses and methods will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive

BRIEF DESCRIPTION OF THE DRAWINGS

Various aspects of apparatuses and methods will now be presented in the detailed description by way of example, and not by way of limitation, with reference to the accompanying drawings, wherein.

DETAILED DESCRIPTION

Figure 1:
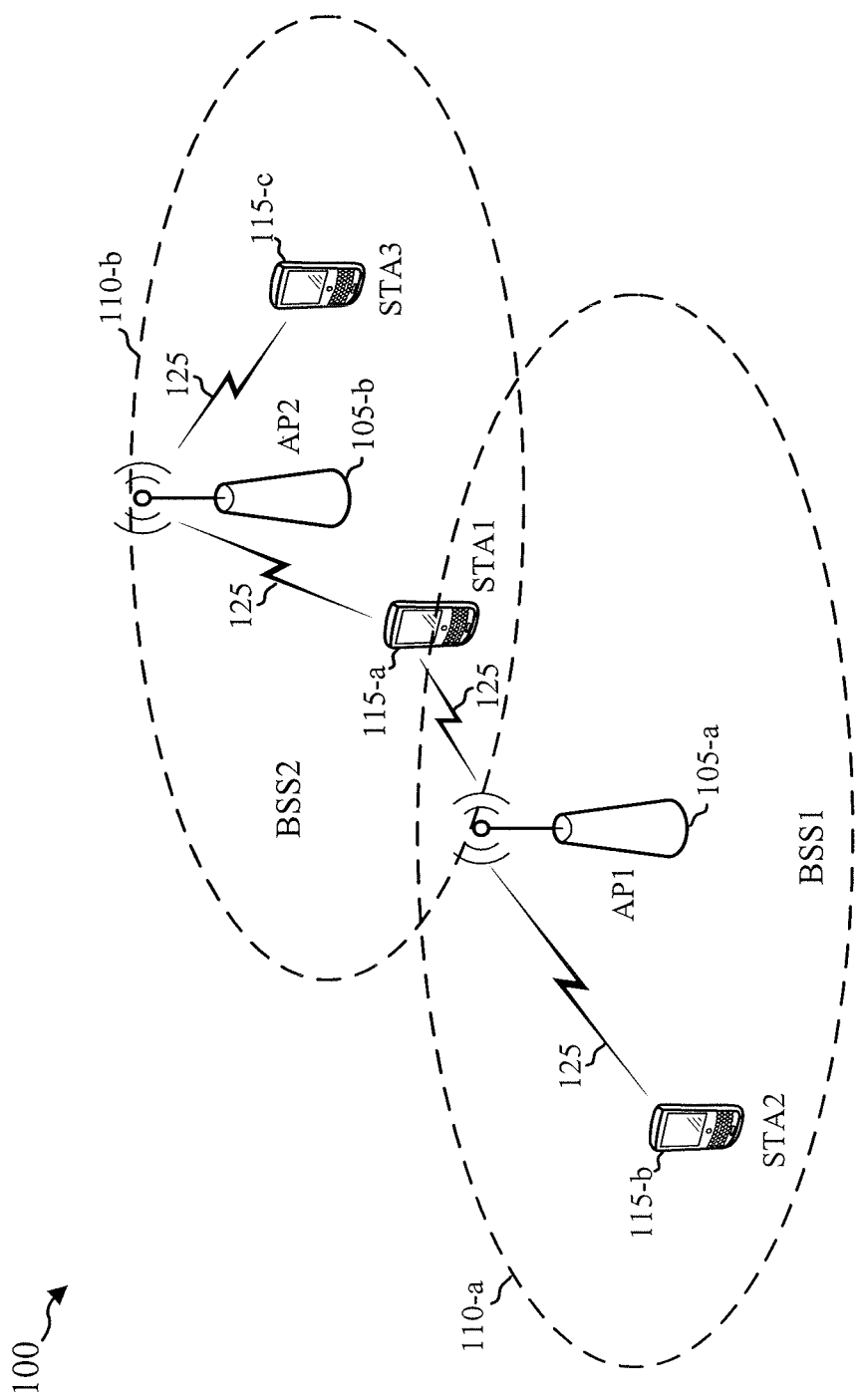
FIG. 1 is a conceptual diagram illustrating an example of a wireless local area network (WLAN) deployment.

Various concepts will be described more fully hereinafter with reference to the accompanying drawings. These concepts may, however, be embodied in many different forms by those skilled in the art and should not be construed as limited to any specific structure or function presented herein. Rather, these concepts are provided so that this disclosure will be thorough and complete, and will fully convey the scope of these concepts to those skilled in the art. The detailed description may include specific details. However, it will be apparent to those skilled in the art that these concepts may be practiced without these specific details. In some instances, well known structures and components are shown in block diagram form in order to avoid obscuring the various concepts presented throughout this disclosure.

As discussed above, some WLAN network deployments may be dense (e.g., have a large number of STAs deployed within the coverage area of multiple APs), which may result in issues related to channel or medium usage. In the above discussed example, one or more STAs or APs may receive packet(s) from a member of an overlapping basic service set (OBSS) that may be intended for a different STA or AP in a different BSS than the receiving device (e.g., STA or AP). Nonetheless, the receiving device (e.g., STA or AP) may expend resources decoding the received OBSS packet(s). During the decoding process, the STA and/or AP is generally unable to schedule its own transmission on the wireless channel or medium. Specifically, upon receiving a packet of the particular OBSS, the one or more devices generally honors a period reserved on the channel for the OBSS packet through the network allocation vector (NAV) or through the duration field in the preamble of the received packet. In other words, even after determining that the received packet is an OBSS packet intended for a different device, the receiving device may continue to defer backoff operations until such time that the period reserved by the channel associated with the OBSS packet expires. However, such extended delay in scheduling traffic transmissions may result in reduced number of transmission opportunities (TXOP) for the device (e.g., STA or AP), thereby contributing to poor throughput rates experience by the STA and/or the AP. In some cases, if there is high number of OBSS packets received at a device, the time required to decode and process each of the plurality of received packets to determine whether the packets are from an OBSS may be large enough that it may adversely impact the available time for transmission, and hence affect overall performance.

The present disclosure provides various aspects related to backoff mechanisms techniques for spatial reuse in an OBSS environment. In some aspects, a device (e.g., STA or AP), receiving a packet, may decode at least a portion of a preamble of the packet to determine whether the packet is sent by a member of an OBSS (e.g., STA or AP from a different BSS). During the decoding process, a backoff operation (e.g., backoff time period) may be deferred or paused pending the results of the decoding. As discussed herein, the term "backoff operation" may refer to the process of waiting a designated time interval or time period before the STA or AP may attempt accessing a channel or medium. The term "backoff operation" may also be associated with techniques used to space out retransmissions as part of network congestion avoidance. An example of such techniques is the exponential backoff algorithm in which a random value within an acceptable range is selected to schedule retransmissions after collisions to avoid further collisions from taking place. In some examples, IEEE 802.11 standard may define channel access mechanisms, including contention based distributed coordination function (DCF) and contention-free point coordination function (PCF) to coordinate multiple devices attempting to access limited channel resources in a wireless network. In DCF, devices (e.g., STA or AP) compete for channel access in a distributed fashion while PCF may be carried out by point coordinator (PC) residing in the AP.

In some aspects, channel access may be governed through inter-frame space such as DCF inter-frame space (DIFS)/PCF inter-frame space (PIFS) and short inter-frame space (SIFS). Thus, in some examples, devices may sense the status of the wireless medium (i.e., whether the medium is idle or busy) for DIFS/PIFS duration prior to accessing the wireless medium for scheduled transmission. SIFS may be an amount of time (in micro seconds) required for a wireless interface to process a received frame and to respond with a response frame. Thus, in some aspects, SIFS may be an inter-frame spacing required prior to transmission of acknowledgment (ACK), a clear to sent (CTS) frame, a block ACK frame, etc. In some aspects, arbitration inter-frame spacing (AIFS) may be used to determine a required time interval between frames being transmitted.

Returning to the above example, devices such as STAs and APs generally defer or pause the backoff operation during decoding of a received packet. In some aspects of the present disclosure, the STAs or APs may reduce the delay in scheduling transmissions on the wireless medium by resuming the backoff operations immediately in response to the determination that the packet is sent by the member of OBSS, and that one or more reuse criteria are met (e.g., RSSI of the packet may be below a threshold). For example, a backoff counter or timer may be paused for decoding and may be subsequently resumed if the decoding identifies the packet as being an OBSS packet, and the reuse criteria are met. In some examples, the backoff operation may resume before the end of the OBSS packet. Specifically, in order to increase reuse of the frequency channel, STA and/or AP, in some situations, may "drop packets" that are from OBSSs. For example, upon receiving a packet, a receiving device (e.g., STA or AP) may determine the BSS ID of the received packet. If the BSS ID of the received packet does not match the BSS ID of the BSS to which the STA or AP belongs, the receiving device may "drop" the OBSS packet. In other words, the device may ignore the remaining portion of the OBSS packet, and thus choose not to honor the NAV or the duration field associated with the OBSS packet. In some examples, the receiving device may even opportunistically transmit another packet on the frequency channel during the NAV of the OBSS packet.

FIG. 1 is a conceptual diagram 100 illustrating an example of a wireless local area network (WLAN) deployment in connection with various techniques described herein. The WLAN may include one or more access points (APs) and one or more mobile stations (STAs) associated with a respective AP. In this example, there are two APs deployed: AP1 105-a in basic service set 1 (BSS1) and AP2 105-b in BSS2, which may be referred to as an OBSS. AP1 105-a is shown as having at least two associated STAs (STA1 115-a and STA2 115-b) and coverage area 110-a, while AP2 105-b is shown having one associated STA3 115-c) and coverage area 110-b. The STAs and AP associated with a particular BSS may be referred to as members of that BSS. In the example of FIG. 1, the coverage area of AP1 105-a may overlap part of the coverage area of AP2 105-b such that STA1 115-a may be within the overlapping portion of the coverage areas. The number of BSSs, APs, and STAs, and the coverage areas of the APs described in connection with the WLAN deployment of FIG. 1 are provided by way of illustration and not of limitation.

In some examples, the APs (e.g., AP1 105-a and AP2 105-b) shown in FIG. 1 are generally fixed terminals that provide backhaul services to STAs 115 within its coverage area or region. In some applications, however, the AP may be a mobile or non-fixed terminal. The STAs (e.g., STA1 115-a, STA2 115-b and STA3 115-c) shown in FIG. 1, which may be fixed, non-fixed, or mobile terminals, utilize the backhaul services of their respective AP to connect to a network, such as the Internet. Examples of an STA include, but are not limited to: a cellular phone, a smart phone, a laptop computer, a desktop computer, a personal digital assistant (PDA), a personal communication system (PCS) device, a personal information manager (PIM), personal navigation device (PND), a global positioning system, a multimedia device, a video device, an audio device, a device for the Internet-of-Things (IoT), or any other suitable wireless apparatus requiring the backhaul services of an AP. An STA may also be referred to by those skilled in the art as: a subscriber station, a mobile unit, a subscriber unit, a wireless unit, a remote unit, a mobile device, a wireless device, a wireless communications device, a remote device, a mobile subscriber station, an access terminal, a mobile terminal, a wireless station, a remote terminal, a handset, a user agent, a mobile client, a client, user equipment (UE), or some other suitable terminology. An AP may also be referred to as: a base station, a base transceiver station, a radio base station, a radio transceiver, a transceiver function, or any other suitable terminology. The various concepts described throughout this disclosure are intended to apply to all suitable wireless apparatus regardless of their specific nomenclature.

Each of STA1 115-a, STA2 115-b, and STA3 115-c may be implemented with a protocol stack. The protocol stack can include a physical layer for transmitting and receiving data in accordance with the physical and electrical specifications of the wireless channel, a data link layer for managing access to the wireless channel, a network layer for managing source to destination data transfer, a transport layer for managing transparent transfer of data between end users, and any other layers necessary or desirable for establishing or supporting a connection to a network.

Each of AP1 105-a and AP2 105-b can include software applications and/or circuitry to enable associated STAs to connect to a network via communications link 125. The APs can send frames or packets to their respective STAs and receive frames or packets from their respective STAs to communicate data and/or control information (e.g., signaling).

Each of AP1 105-a and AP2 105-b can establish a communications link 125 with an STA that is within the coverage area of the AP. Communications link 125 can comprise communications channels that can enable both uplink and downlink communications. When connecting to an AP, an STA can first authenticate itself with the AP and then associate itself with the AP. Once associated, a communications link 125 may be established between the AP 105 and the STA 115 such that the AP 105 and the associated STA 115 may exchange frames or messages through a direct communications channel. It should be noted that the wireless communication system, in some examples, may not have a central AP (e.g., AP 105), but rather may function as a peer-to-peer network between the STAs. Accordingly, the functions of the AP 105 described herein may alternatively be performed by one or more of the STAs 115.

While aspects of the present disclosure are described in connection with a WLAN deployment or the use of IEEE 802.11-compliant networks, those skilled in the art will readily appreciate, the various aspects described throughout this disclosure may be extended to other networks employing various standards or protocols including, by way of example, BLUETOOTH® (Bluetooth), HiperLAN (a set of wireless standards, comparable to the IEEE 802.11 standards, used primarily in Europe), and other technologies used in wide area networks (WAN)s, WLANs, personal area networks (PAN)s, or other suitable networks now known or later developed. Thus, the various aspects presented throughout this disclosure for performing operations based on modifications and enhancements to dynamic sensitivity control may be applicable to any suitable wireless network regardless of the coverage range and the wireless access protocols utilized.

In some aspects, one or more APs (105-a and 105-b) may transmit on one or more channels (e.g., multiple narrowband channels, each channel including a frequency bandwidth) a beacon signal (or simply a "beacon"), via a communications link 125 to STA(s) 115 of the wireless communication system, which may help the STA(s) 115 to synchronize their timing with the APs 105, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In an aspect, a device (e.g., APs 105 and/or STAs 115) may include one or more components for performing various functions described in the present disclosure. For example, the device (e.g., APs 105 and/or STAs 115) may include a communication management component 405 (not shown—see FIG. 4) to perform procedures related to backoff mechanism techniques for spatial reuse. These procedures may include, for example, detecting whether a received packet is an OBSS packet (i.e., received from a member of an OBSS) and resuming a backoff operation previously paused (e.g., backoff time period) immediately following a determination that the packet is an OBSS packet. In some aspects, the device may resume the backoff operations prior to the end of the OBSS packet. Particularly, the receiving device may resume the backoff operations during the NAV period associated with the OBSS packet, and thereby choose to transmit another packet on the frequency channel during the NAV of the OBSS packet if the backoff operation expires. In some aspects, the NAV period associated with the OBSS packet may be longer than an amount of time it would take to decode the OBSS packet if the receiving device was to decode and/or process the entire packet (e.g., preamble and the data). Thus in this example, resuming the backoff operations before the end of the packet may include resuming the backoff operations prior to the expiration of the NAV period associated with the OBSS packet.

Thus, in accordance with aspects of the present disclosure, devices (e.g., STA 115 and/or AP 105) may, in order to increase reuse in a wireless network (e.g., an IEEE 802.11ax wireless network), transmit on top of transmissions coming from an OBSS and refrain from transmitting on top of transmission coming from the same BSS (also known as in-BSS). To enable a wireless device to determine whether a transmission is from the same BSS as the wireless device or from an OBSS, some packets may have a color code/information that identifies the BSS from which the packets originated. Color code/information may be a BSS identifier (BSSID) or a partial BSSID, or some other sequence. When the wireless device receives a packet with color information, the wireless device may determine if the packet is associated with the same BSS as the wireless device or if the packet is associated with an OBSS.

Figure 2A:
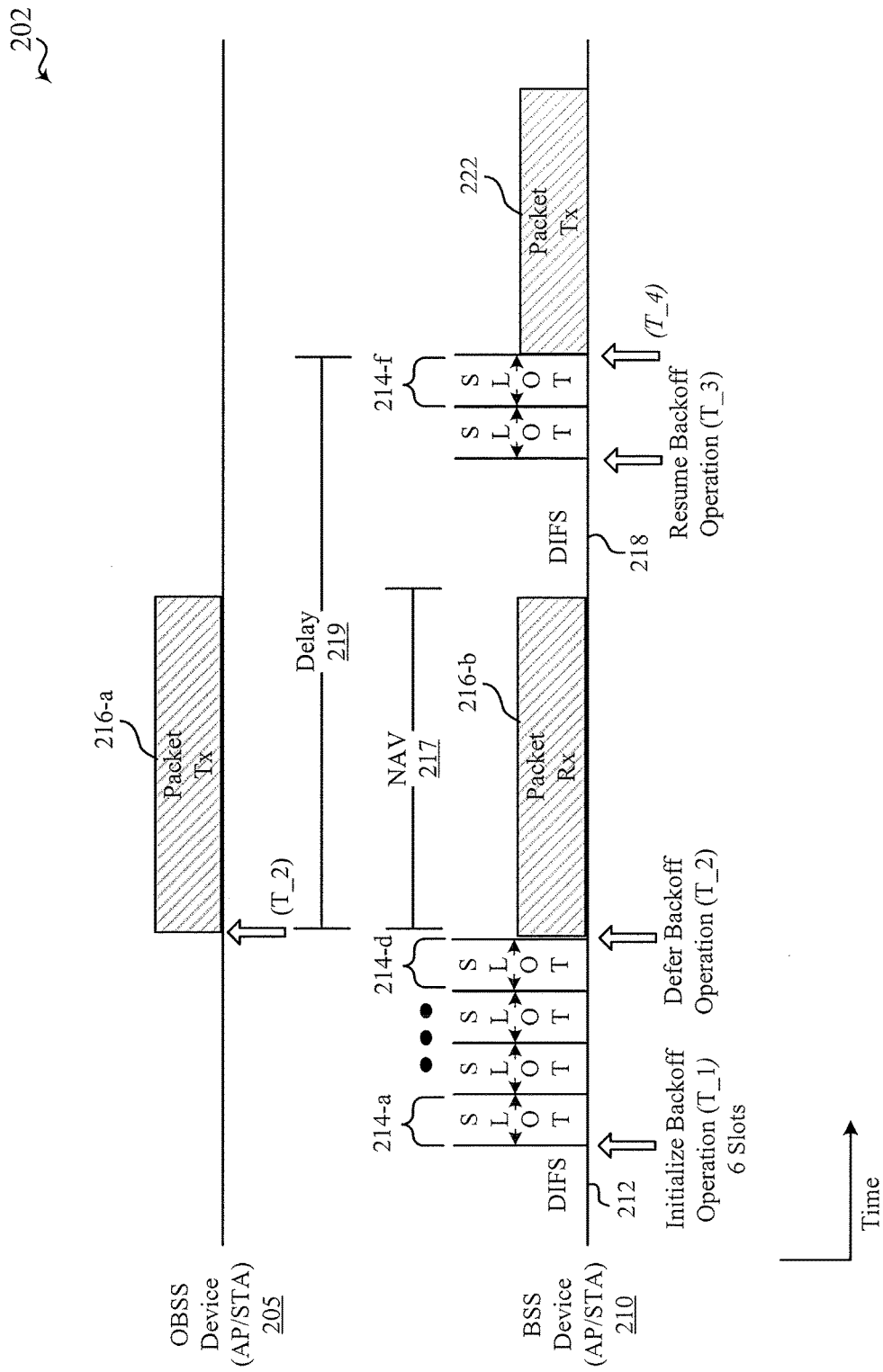
FIG. 2A is an example of related art illustrating a timing diagram associated with processing of OBSS packets.

FIG. 2A is an example of a related art illustrating a timing diagram 202 associated with typical processing OBSS packets. The timing diagram 202 illustrates an OBSS device 205 that may be an AP or STA as illustrated in FIG. 1. In one example, the OBSS device 205 may be an AP 105-b and/or STA3 115-c belonging to or being a member of BSS2 described with reference to FIG. 1. Additionally or alternatively, the timing diagram 202 may include a BSS device 210 (e.g., in-BSS) that may also be one of an AP 105 or STA 115 illustrated in FIG. 1. For example, the BSS device 210 may be an AP 105-a or STA1 115-a belonging to or being a member of BSS1.

As discussed above, in some aspects, channel access may be governed through inter-frame space such as DIFS/PIFS and SIFS. Thus, in some examples, one or more devices (OBSS device 205 and/or BSS device 210) may sense the status of the wireless medium (i.e., whether the medium is idle or busy) for DIFS/PIFS duration prior to accessing the wireless medium for scheduled transmission. In some examples, the BSS device 210 may have data pending for transmission in one or more queues associated with the BSS device 210. However, prior to initiating transmission, IEEE 802.11 standard may dictate that the BSS device 210 is to monitor the channel or medium for DIFS 212. Although the instant description is illustrated with reference to DIFS 212, it should be understood by those skilled in the art that the monitoring period may be defined by other channel procedures, including but not limited to PIFS, SIFS, or AIFS. Thus, if, after detecting that the radio channel is idle for the DIFS 212 (or alternatively PIFS, SIFS, or AIFS), the BSS device 210 may initialize a backoff operation at T_1. In some aspects, initializing a backoff operation may include setting a backoff counter or timer to a designated (or pseudo-random) number based on the data awaiting transmission (e.g., retransmission due to earlier collisions). For example, if the data awaiting transmission is voice data, the backoff counter may be set at a lower number than if the data awaiting transmission is a video data or best effort data. In some aspects, the backoff counter may be defined by number of idle frame spacing required prior to transmission of data packets on the medium. In one aspect the backoff stops when the medium is busy and resumes when the medium is idle. In one or more examples, a BSS device 210 may include a plurality of backoff operations, where each backoff instance within the BSS device 210 may contend for an interval of time that may be referred to as transmission opportunity (TXOP). A TXOP may be an interval of time during which a device (e.g., BSS device 210) may have a right to initiate transmissions, defined by a starting time and a maximum duration.

In the example illustrated in FIG. 2A, initializing the backoff operation may include setting the backoff counter (or backoff time interval/time period) to 6 slots 214 before the BSS device 210 may be eligible for TXOP. The selection of 6 slots is only utilized for illustration purposes. Those of ordinary skill in the art would understand that the backoff counter may be set to any variable. Additionally, for the purposes of the present disclosure, the term "backoff operation" may be used interchangeably with backoff counter, backoff timer, backoff time interval, backoff time period, and/or backoff frame spacing in the appropriate context. At each slot (e.g., 214-a, 214-d, 214-f, etc.), the backoff counter may progressively decrement until the backoff counter reaches the value of zero which may signal TXOP for the BSS device 210. However, as illustrated in FIG. 2A, a BSS device 210, at time interval T_2 may receive a packet 216-b transmitted by the OBSS device 205. As a result, at time interval T_2, the BSS device 210 may defer (or pause) the backoff operation in order to decode the received packet. Generally, in related arts, the BSS device 210 may wait the length of the packet 216 plus the ACK time, as well as the NAV period associated with the data packet 216, before resuming normal operations. For example, the BSS device 210 may again monitor the radio channel to determine whether the channel is idle for the DIFS 218 (or alternatively PIFS, SIFS, or AIFS). Following the monitoring period, the BSS device 210 may resume the backoff operation at T_3, and subsequently transmit the pending data packet 222 after the backoff counter decrements to zero at T_4.

However, as it would be appreciated by those in the art, waiting until T_3 to resume backoff operations when the received data packet 216 is an OBSS packet (i.e., sent by a member of an OBSS) may contribute to significant delays 219 before the BSS device 210 is able to transmit any pending traffic on the wireless channel or medium.

Figure 2B:
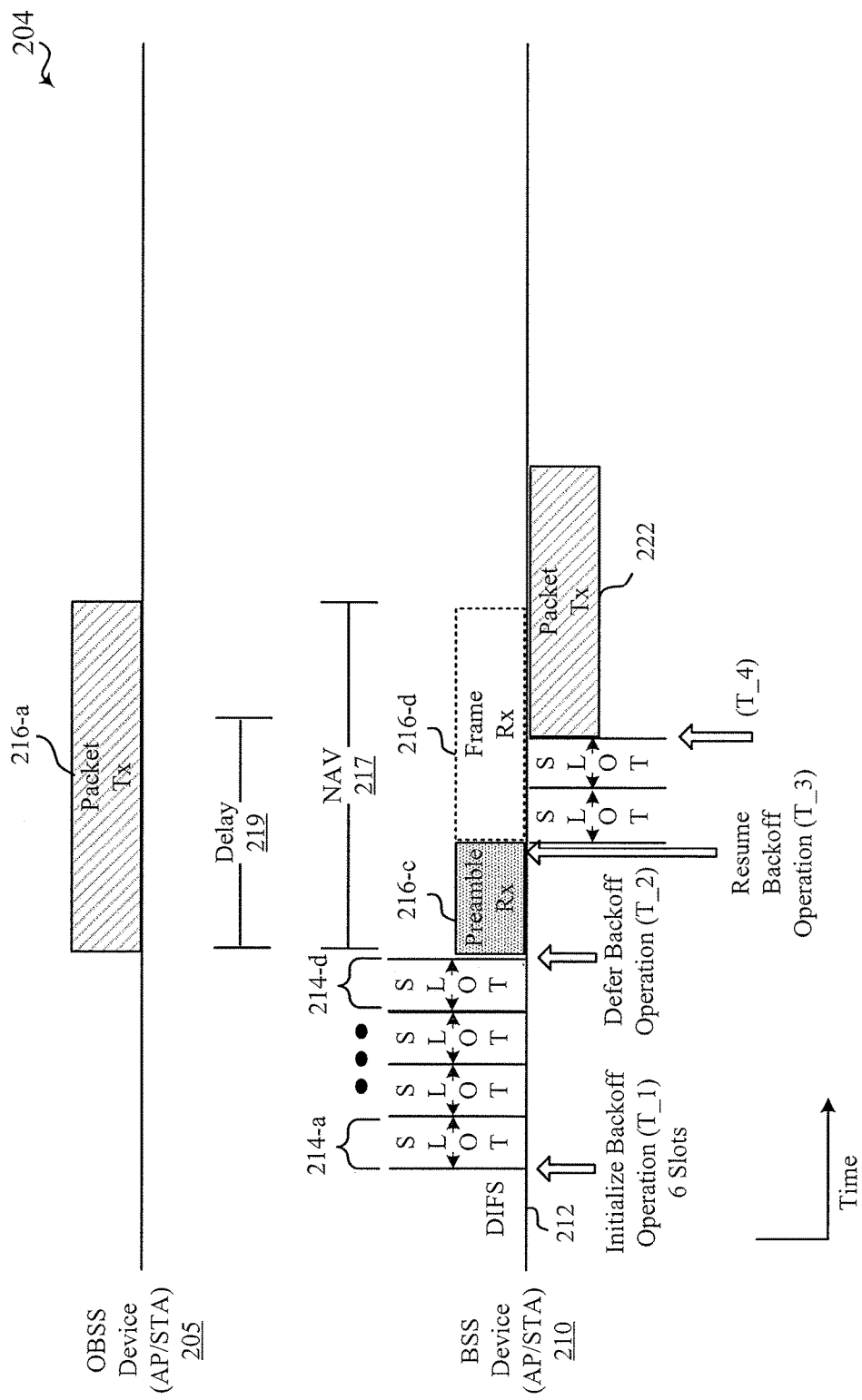
FIGS. 2B-2E illustrate timing diagrams of various aspects of the present disclosure.

Aspects of the present disclosure reduce such delays by modifying the timing and/or conditions associated with the resumption of backoff operations, as illustrated in FIGS. 2B-2E, in response to determining that the packet is sent by an OBSS device 205. In some aspects, determining that the packet is sent by an OBSS device 205 may include decoding at least a portion of a preamble of the packet 216-*a*. Turning now to FIG. 2B, a timing diagram 204 similar to the timing diagram 202 discussed in FIG. 2A. However, in contrast to FIG. 2A, the timing diagram 204 illustrates that at T_2, the BSS device 210, upon receiving a data packet 216 transmitted by the OBSS device 205 decodes at least a portion of a preamble 216-*c* of the packet 216 to determine whether the packet 216 is an OBSS packet. In some aspects, BSS device 210 may utilize a color code/information that identifies the BSS from which the packet 216 originated. Color code/information may be a BSSID or a partial BSSID incorporated in the portion of the preamble 216-*c*. Thus, when the BSS device 210 receives a packet 216 with color information, the BSS device 210 may determine if the packet is associated with the same BSS as the BSS device 210 or if the packet is associated with an OBSS device 205. Such a method may include identifying a sequence (e.g., BSSID) in the preamble 216-*c* of the packet 216 and determining that the sequence (e.g., BBSID) fails to match a sequence for packets intended for in-BSS devices.

Additionally or alternatively, if the BSS device 210 determines that the received packet 216 is an OBSS packet (i.e., sent by a member of the OBSS), and that one or more reuse criteria are met, the BSS device 210, at T_3, may immediately resume a modified backoff operation (e.g., backoff counter). In some aspects, the device may resume the backoff operations prior to the end of the OBSS packet. Particularly, the receiving device may resume the backoff operations during the NAV period 217 associated with the OBSS packet 216. Thus, in the example of timing diagram 204, aspects of the present disclosure may set the frame spacing to zero to allow the backoff operation to resume immediately after the determination that the packet is sent by the member of the OBSS. In other words, unlike DIFS 218 discussed with reference to FIG. 2A, one example of the present disclosure may not impose any additional delays in resuming the backoff operation or counter. As a result, the BSS device 210 may be configured to transmit a signal or packet 222 at the expiration of the backoff operations. In one example, the BSS device 210 may transmit the signal or packet 222 prior to the end of the received OBSS packet 216 (i.e., prior to the expiration of the NAV period associated with the OBSS packet 216). Implementing aspects of the present disclosure described in FIG. 2B may significantly reduce the delay 219 in scheduling transmissions when compared to the relevant art described in FIG. 2A.

Figure 2C:
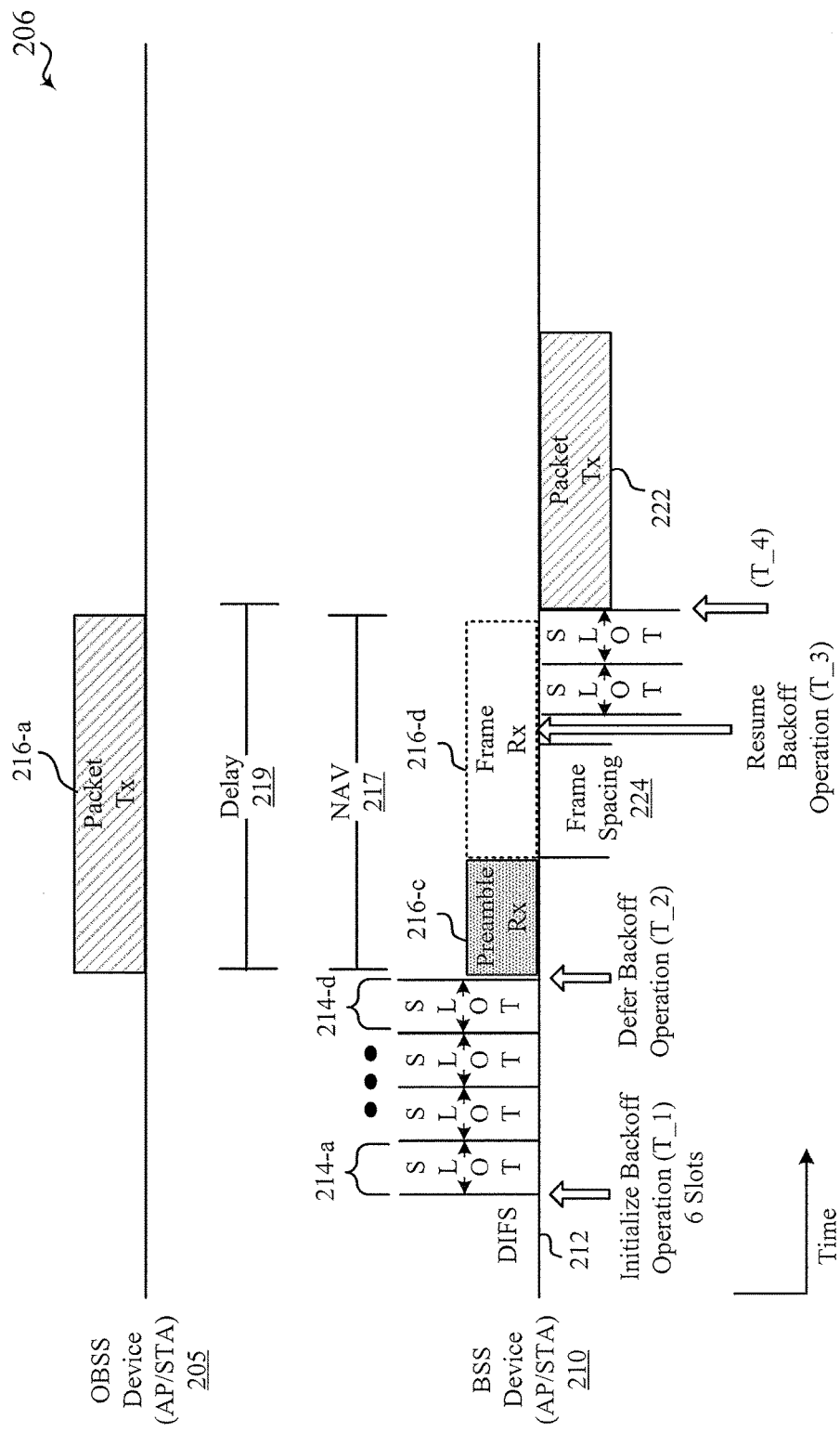

FIG. 2C illustrates yet another example of a timing diagram 206 for reducing delay in scheduling traffic in an OBSS environment. The timing diagram 206 may implement similar features recited in reference to FIG. 2B, including decoding at least a portion of a preamble 216-*c* of the packet 216 to determine whether the packet 216 is an OBSS packet. However, in contrast to timing diagram 204 of FIG. 2B where the frame spacing may be set to zero to allow the backoff operation to resume immediately after the determination that the packet is sent by the member of the OBSS, the backoff operation, in accordance with aspects of timing diagram 206, is resumed a frame spacing 224 after the determination that the packet is sent by an OBSS device. In some aspects, the frame spacing 224 may be defined by AIFS. In some examples, a value of the frame spacing 224 and/or a value of the AIFS may be based on an access class of the BSS device 210 or the type of data pending transmission. In one or more examples, the value of the frame spacing 224 may be smaller than those defined by the AIFS.

Figure 2D:
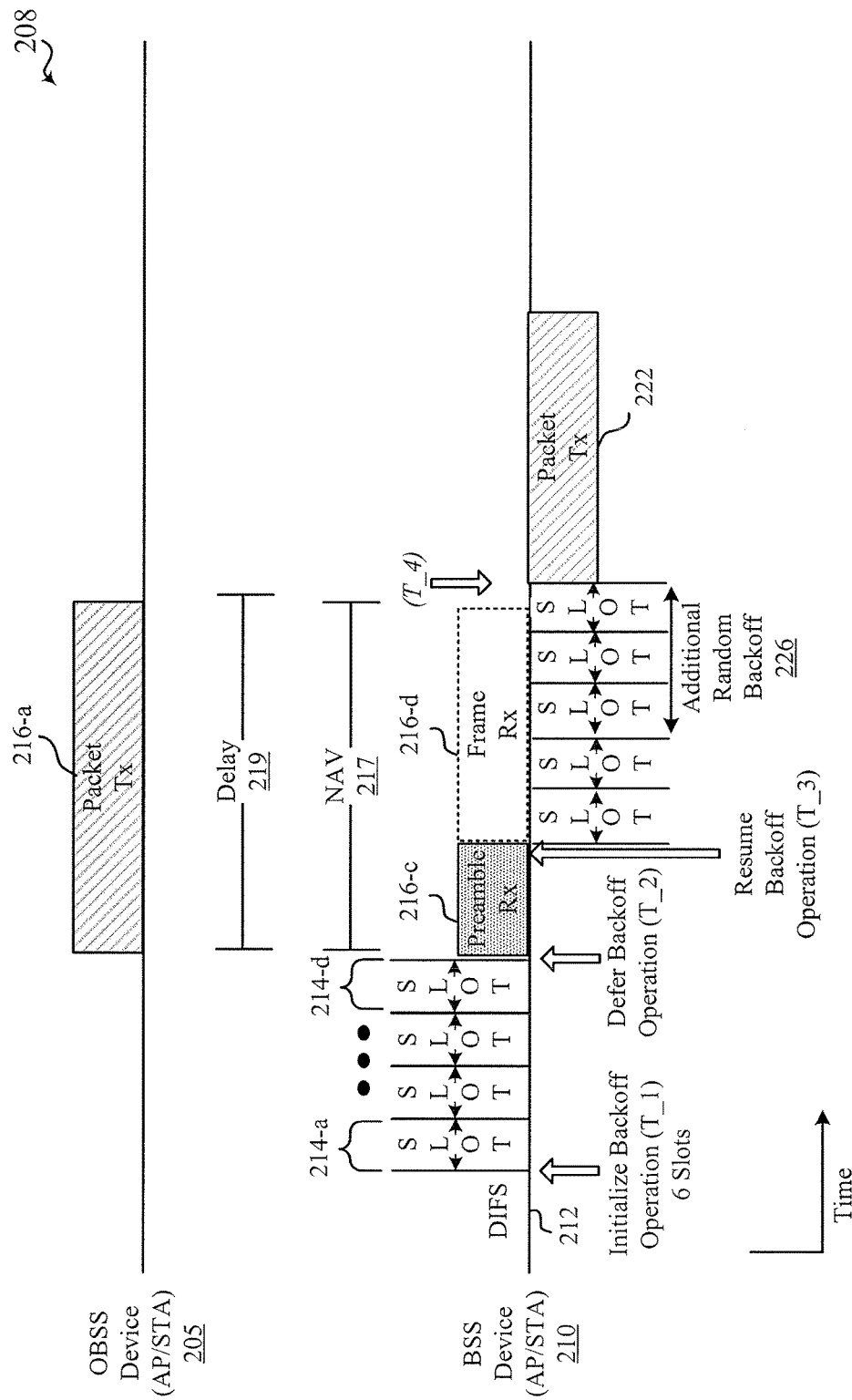

Additionally or alternatively, in some aspects, as illustrated in FIG. 2D, the frame spacing may again be set to zero in order to allow the backoff operation to resume, at T_3, immediately after the determination that the packet is sent by an OBSS device 205. However, in order to prevent multiple devices from attempting to access the channel or medium simultaneously, aspects of the present disclosure may add a pseudo-random time period 226 to a remaining time of the backoff operation (e.g., backoff counter) and/or to the AIFS. As a result, multiple devices with pending traffic may be staggered and prevent collisions.

Figure 2E:
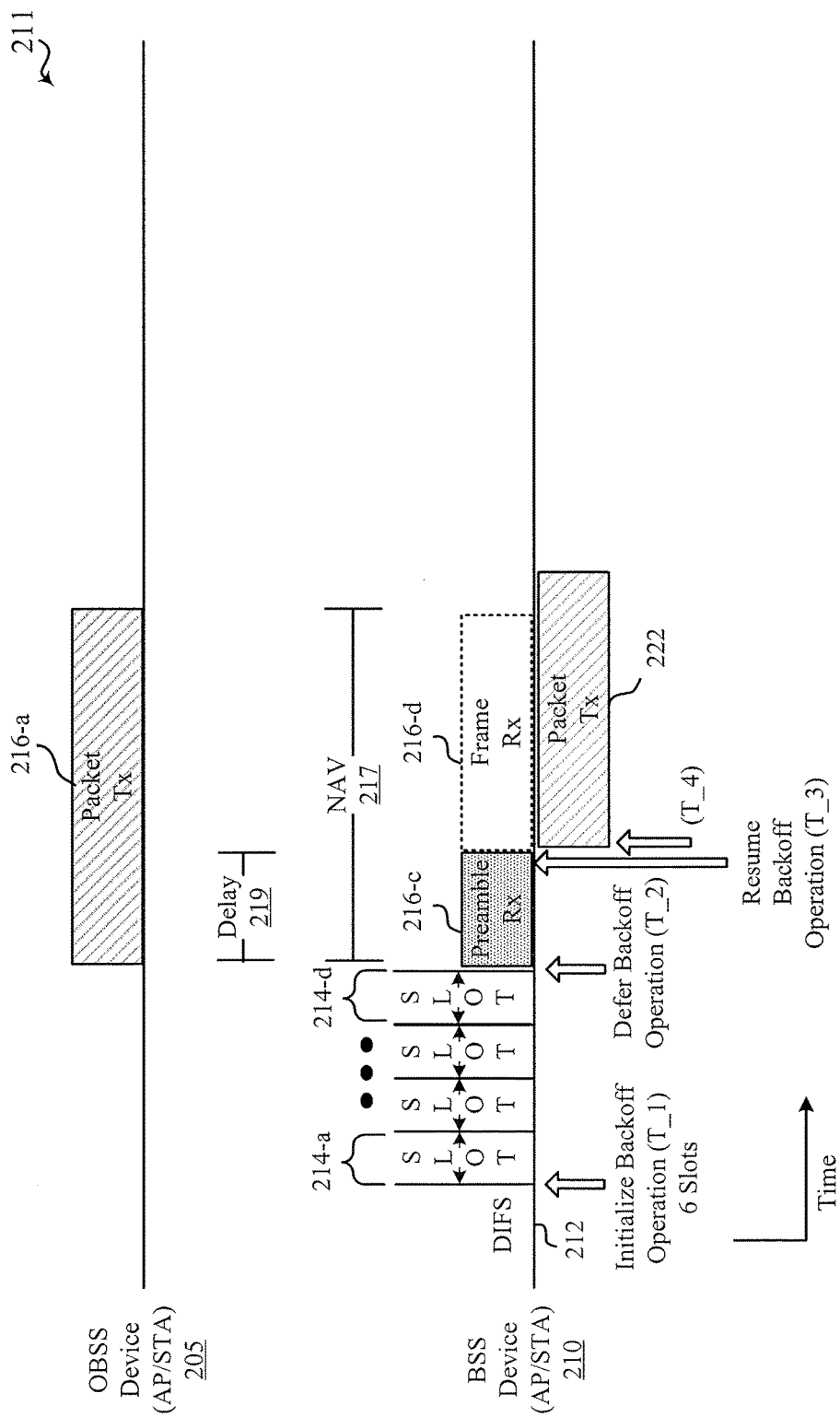

In yet further example, as illustrated in FIG. 2E, one or more aspects of the present disclosure may further include method of reducing a remaining time of the backoff operation based at least in part on a time it took to decode the at least a portion of the preamble or a duration of the preamble. For example, if the BSS device 210 expends 2 slots in decoding the portion of the preamble or a duration of the preamble, the pending backoff operation (e.g., backoff counter) may further be reduced by equivalent number of slots (e.g., 2 slots) when resuming the backoff operation at T_3. Thus, in this example, if the backoff operation, at T_2, is deferred or paused with 2 remaining slots prior to the BSS device 210 being eligible for TXOP, the BSS device 210, in accordance with aspects of the present disclosure, may be configured to further reduce the remaining slots by the same number of slots (or time) expended in decoding a portion of the received packet. For example, in above illustrated example, when the backoff operation is resumed, at T_3, the remaining backoff time interval/time period may be set to zero. As a result, the BSS device may be eligible to attempt transmission of signal or packet 222 immediately at T_4. Alternatively, for example, if, at T_2, the backoff operation is deferred with 10 slots remaining and the BSS device expends 6 slots to decode at least a portion of the preamble 216-*c* to determine that the packet is a OBSS packet, the BSS device 210 may resume modified backoff operation, at T_3, where the backoff counter may be adjusted (and reduced) by 6 slots, such that BSS device 210 may only wait 4 slots before be TXOP eligible. As it would be appreciated by those in the art, the BSS device 210, in accordance with features described in reference to timing diagram 211 does not penalize the BSS device 210 for decoding the OBSS packet 216. Additionally or alternatively, aspects of the present disclosure may add pseudo-random time period (as discussed with reference to FIG. 2D) at time period T_4 before transmitting a packet. Thus, in the instances where the backoff counters associated with multiple devices expires during the decoding period to at least a portion of the preamble 216-*c*, aspects of the present disclosure may add a pseudo-random time period to avert multiple devices from initiating packet transmission.

Figure 3:
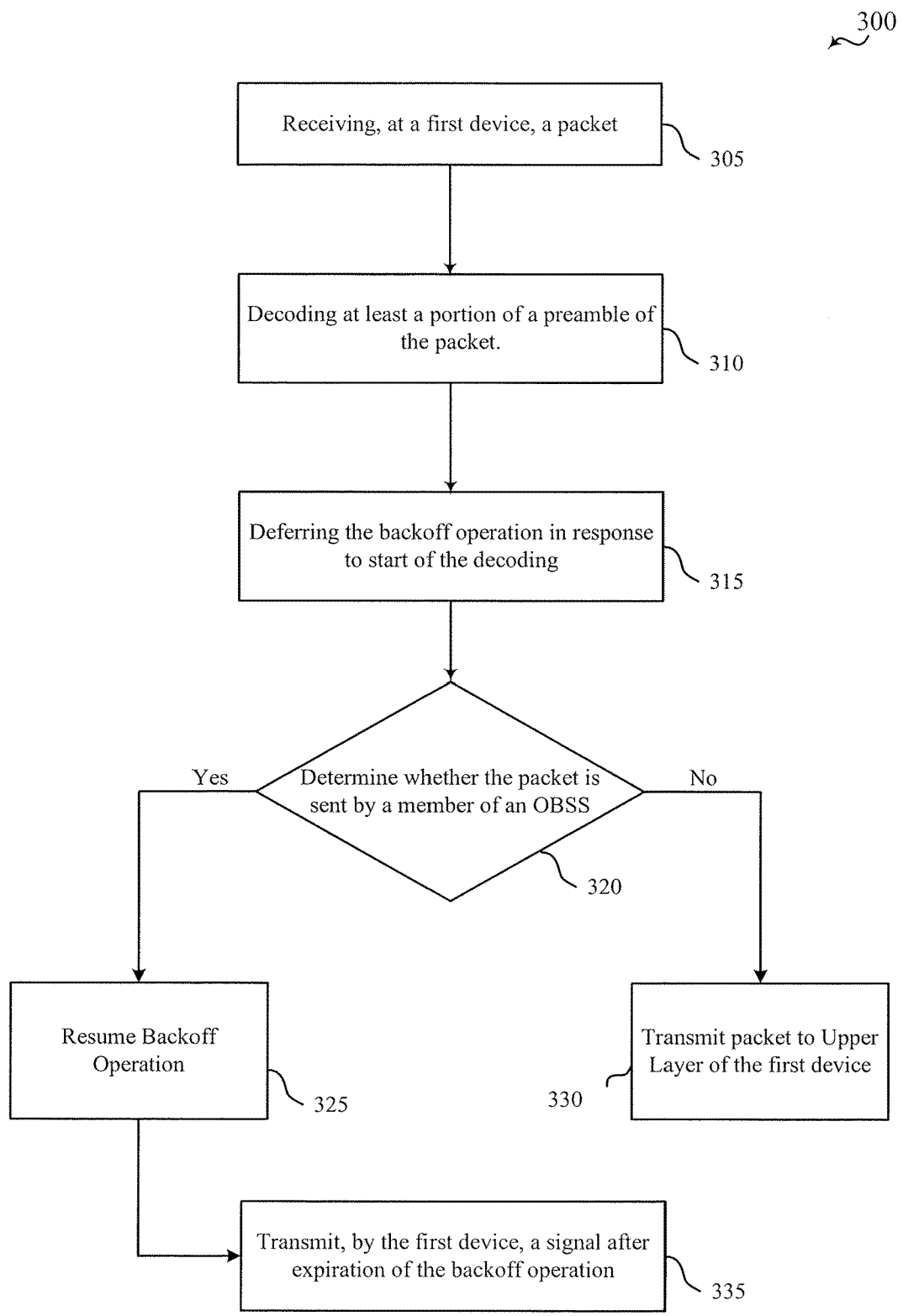
FIG. 3 is a flowchart illustrating a method of reducing transmission delays in accordance with various aspects of the present disclosure.

FIG. 3 shows a flowchart illustrating a method 300 for reducing delay in scheduling traffic transmissions by modifying backoff mechanisms for spatial reuse in an OBSS environment in accordance with various aspects of the present disclosure. In some examples, the method 300 may include a first device (e.g., STA 115 or AP 105), at 305, receiving a packet. In some aspect, a transceiver (e.g., 402-*a* or 402-*b*) may be configured to perform the receiving step. In some examples, receiving the packet may include identifying a time period reserved on the channel for the packet through the NAV.

At 310, the first device may begin decoding at least a portion of a preamble of the packet. In some examples, decoding at least portion of the preamble of the packet may comprise identifying a sequence (e.g., BSSID) in the preamble of the packet and determining that the sequence (e.g., BBSID) fails to match a sequence for packets intended for in-BSS devices. In some aspects, the decoding may be performed by the packet decoding component 410-a or 410-b (depending on whether the STA 115 or AP 105 is performing the method 300). To enable a wireless device to determine whether a transmission is from the same BSS (i.e., in-BSS device) as the wireless device or from an OBSS, some packets may have a color code/information that identifies the BSS from which the packets originated. Color code/information may be a BSS identifier (BSSID) or a partial BSSID. In some aspects of the present disclosure, the method 300, at 315, may include deferring the backoff operation in response to the start of the decoding of the packet. In some aspects, the backoff operation management component 415-a or 415-b may perform the step of deferring. Deferring the backoff operation may include pausing or stopping the backoff time period or time interval remaining before the device may access the wireless channel or medium. In some aspects, the receiver device may not pause or stop the backoff counter. When the wireless device receives a packet with color information, the wireless device may determine if the packet is associated with the same BSS as the wireless device or if the packet is associated with an OBSS.

Specifically, the receiving device (i.e., first device) may identify a sequence in the preamble of the packet and determine whether the sequence matches a sequence for packets intended for members of a BSS associated with the receiving device. The receiving device may further determine that the packet is sent by the member of the OBSS in response to a determination that the match fails. If the received packet is from a device that is part of the same BSS (e.g., inter-BSS members) as the receiving device, the receiving device (i.e., first device) may further processes the packet to determine whether the packet is addressed to the first device within the BSS. If the packet is addressed to the first device, the first device may, at 330, send the packet to the upper layers (e.g., the internet protocol (IP) layer and the Application layer) at the first device. However, if, at 320, the first device determines that the packet is sent by a member of an OBSS, the first device may, at 325, resume the backoff operations. This may be during the NAV period associated with the OBSS packet. In other words, the first device, upon determining that the received packet is an OBSS packet intended for a different device, may resume the backoff operations before the period reserved on the channel for the OBSS packet through that packet's NAV or before an end of the packet (e.g., if the packet length is less than the time.

In some examples, resuming the backoff operation may include adding a frame space after the determination that the packet is sent by the member of OBSS prior to allowing the first device to access the channel or medium. In one or more examples, the frame space may be based on arbitration inter-frame spacing (AIFS). In some aspects, AIFS may be a time interval required between frames being transmitted by the first device. In some examples, AIFS may define different inter-frame gaps for traffic from different priority queues (i.e., voice queue, video queue, best effort queue and background queue). In some aspects, backoff may reuse if the medium is determined to be available based on clear channel assessment (CCA) and/or the NAV.

In some examples, each of the four priority queues may have a defined inter-frame space value corresponding to the priority assigned to the queue. For example, the voice queue may have the highest priority and as such have the lowest inter-frame space timer. In this manner, AIFS may allow a statistical advantage for traffic in higher priority queues to be transmitted prior to the lower priority queues because the high priority queue frames may not be required to wait as long. In some aspects, the AIFS timers assigned by IEEE 802.11e may be defined as 1 Short Inter-Frame Spacing (SIFS) value plus a variable number of slots times (AIFSN) which are defined by the physical layer encoding method in-use (e.g., CCK, DSSS, OFDM). Accordingly, in some examples, the frame spacing required when resuming the backoff operation may be defined by the AIFS values for each of the four priority queues, and thus be dependent on the type of data awaiting transmission.

Additionally or alternatively, in some examples, the frame spacing required when resuming the backoff operation may be set to a shorter value than the default value assigned by the AIFS. For example, if the default value for the AIFS is set for 10 microseconds, a modified frame spacing may be implemented when resuming the backoff operation. The modified frame spacing may be, for example, 4 microseconds. It should be understood by those skilled in the art that the varying frame spacing values discussed herein are provided only for illustration purposes and may not be construed as being limited only to the identified values. In some examples, the value of the frame spacing and a value of the AIFS may be based on the access class of the device (e.g., first device). Thus, in one or more examples, aspects of the present disclosure may assign different values to different types of data to be transmitted and/or different devices awaiting access to the channel or medium.

In yet further examples, a frame spacing required for transmission of traffic, when resuming backoff operation, may be set to zero in order to allow the backoff operation to resume immediately after the determination that the packet received at the first device is sent by the member of the OBSS. As such, aspects of the present disclosure may expedite transmission of traffic awaiting access to the channel or medium, and reduce overall delay experienced by the first device.

In another example, resuming the backoff operation, at 325, may include reducing a remaining time from the backoff operation based at least in part on a time/slots it took to decode at least a portion of the preamble or a duration of the preamble. For example, if the first device expends 6 slots (e.g., each slot being 9 microseconds) in decoding the portion of the preamble or a duration of the preamble, the pending backoff operation (e.g., backoff time interval and/or time period) may further be reduced by equivalent number of slots (e.g., 6 slots) when resuming the backoff operation. Thus, in this example, if the backoff operation, at 315, is deferred or paused with 15 remaining slots prior to the first device being able to access the channel, the first device, in accordance with aspects of the present disclosure, may be configured to further reduce the remaining slots by the number of slots (or time) expended in decoding a portion of the received packet. For example, in above illustrated example, when the backoff operation is resumed, at 325, the remaining backoff time interval/time period may be set to resume with 9 slots remaining. As a result, the first device may be eligible to attempt transmission of a signal after waiting 9 slots (instead of 15 slots it otherwise would in normal operation). As it would be appreciated by those in the art, the first device, in accordance with this example, would not be penalized for decoding the OBSS packet.

Additionally or alternatively, in some examples, at 325, the backoff operation may add a pseudo-random time period or interval to the remaining time of the backoff operation to prevent multiple devices (STA or AP) from attempting to access the channel or medium simultaneously resulting in traffic collision. In other examples, resuming the backoff operation may comprise utilizing CCA procedures to determine whether a wireless medium is idle or busy.

In some aspects, determining which of the plurality of backoff operations to utilize may be based on receiving a message from the AP identifying which of the plurality of procedures to use when resuming the backoff operation in response to the determination that the packet is sent by the member of an OBSS, and certain reuse conditions are met. In some examples, the AP may assign different backoff operations to different devices in order to stagger a plurality of devices attempting to access the channel or medium.

Figure 4A:
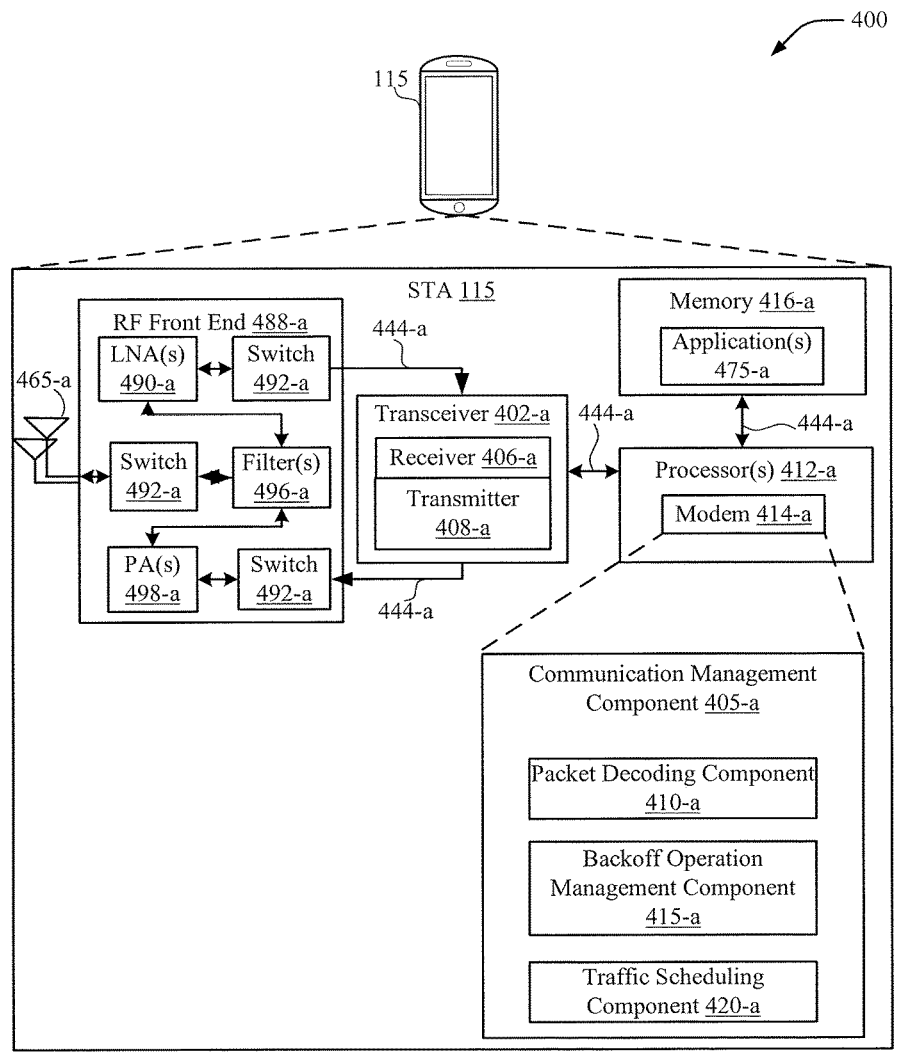
FIGS. 4A-4B are schematic diagrams of a device including an aspect of an STA and AP that may implement various aspects of the present disclosure.

FIG. 4A describes hardware components and subcomponents of the STA 115 for implementing one or more methods (e.g., methods 300 and 500) described herein in accordance with various aspects of the present disclosure. For example, one example of an implementation of STA 115 may include a variety of components, some of which have already been described above, but including components such as one or more processors 412-a and memory 414-a and transceiver 402-a in communication via one or more buses 444-a, which may operate in conjunction with communication management component 405-a to enable one or more of the functions described herein related to including one or more methods of the present disclosure. Further, the one or more processors 412-a, modem 414-a, memory 416-a, transceiver 402-a, RF front end 488-a and one or more antennas 465-a, may be configured to support voice and/or data calls (simultaneously or non-simultaneously) in one or more radio access technologies.

In an aspect, the one or more processors 412-a can include a modem 414-a that uses one or more modem processors. The various functions related to communication management component 405-a may be included in modem 414-a and/or processors 412-a and, in an aspect, can be executed by a single processor, while in other aspects, different ones of the functions may be executed by a combination of two or more different processors. For example, in an aspect, the one or more processors 412-a may include any one or any combination of a modem processor, or a baseband processor, or a digital signal processor, or a transmit processor, or a receiver processor, or a transceiver processor associated with transceiver 402-a. In other aspects, some of the features of the one or more processors 412-a and/or modem 414-a associated with communication management component 405-a may be performed by transceiver 402-a.

Also, memory 414-a may be configured to store data used herein and/or local versions of applications or communication management component 405-a and/or one or more of its subcomponents being executed by at least one processor 412-a. Memory 416-a can include any type of computer-readable medium usable by a computer or at least one processor 412-a, such as random access memory (RAM), read only memory (ROM), tapes, magnetic discs, optical discs, volatile memory, non-volatile memory, and any combination thereof. In an aspect, for example, memory 416-a may be a non-transitory computer-readable storage medium that stores one or more computer-executable codes defining communication management component 440 and/or one or more of its subcomponents, and/or data associated therewith, when STA 115 is operating at least one processor 412-a to execute communication management component 405-a and/or one or more of its subcomponents.

Transceiver 402-a may include at least one receiver 406-a and at least one transmitter 408-a. Receiver 406-a may include hardware, firmware, and/or software code executable by a processor for receiving data, the code comprising instructions and being stored in a memory (e.g., computer-readable medium). Receiver 406-a may be, for example, a radio frequency (RF) receiver. In an aspect, receiver 406-a may receive signals transmitted by at least one AP 105. Additionally, receiver 406-a may process such received signals, and also may obtain measurements of the signals, such as, but not limited to, Ec/Io, SNR, RSRP, RSSI, etc. Transmitter 408-a may include hardware, firmware, and/or software code executable by a processor for transmitting data, the code comprising instructions and being stored in a memory (e.g., computer-readable medium). A suitable example of transceiver 402-a may include, but is not limited to, an RF transmitter or RF receiver.

Moreover, in an aspect, STA 115 may include RF front end 488-a, which may operate in communication with one or more antennas 465-a and transceiver 402-a for receiving and transmitting radio transmissions, for example, wireless communications transmitted by at least one AP 105 or wireless transmissions transmitted by STA 115. RF front end 488-a may be connected to one or more antennas 465-a and can include one or more low-noise amplifiers (LNAs) 490-a, one or more switches 492-a, one or more power amplifiers (PAs) 498-a, and one or more filters 496-a for transmitting and receiving RF signals.

In an aspect, LNA 490-a can amplify a received signal at a desired output level. In an aspect, each LNA 490-a may have a specified minimum and maximum gain values. In an aspect, RF front end 488-a may use one or more switches 492-a to select a particular LNA 490-a and its specified gain value based on a desired gain value for a particular application.

Further, for example, one or more PA(s) 498-a may be used by RF front end 788 to amplify a signal for an RF output at a desired output power level. In an aspect, each PA 498-a may have specified minimum and maximum gain values. In an aspect, RF front end 488-a may use one or more switches 492-a to select a particular PA 498-a and its specified gain value based on a desired gain value for a particular application.

Also, for example, one or more filters 496-a can be used by RF front end 488-a to filter a received signal to obtain an input RF signal. Similarly, in an aspect, for example, a respective filter 496-a can be used to filter an output from a respective PA 498-a to produce an output signal for transmission. In an aspect, each filter 496-a can be connected to a specific LNA 490-a and/or PA 498-a. In an aspect, RF front end 488-a can use one or more switches 492-a to select a transmit or receive path using a specified filter 496-a, LNA 490-a, and/or PA 498-a, based on a configuration as specified by transceiver 402-a and/or processor 412-a.

As such, transceiver 402-a may be configured to transmit and receive wireless signals through one or more antennas 465-a via RF front end 488-a. In an aspect, transceiver may be tuned to operate at specified frequencies such that STA 115 can communicate with, for example, one or more APs 105 or one or more cells associated with one or more APs 105. In an aspect, for example, modem 414-a can configure transceiver 402 to operate at a specified frequency and power level based on the STA configuration of the STA 115 and the communication protocol used by modem 414-a.

In an aspect, modem 414-a can be a multiband-multimode modem, which can process digital data and communicate with transceiver 402-a such that the digital data is sent and received using transceiver 402-a. In an aspect, modem 414-a can be multiband and be configured to support multiple frequency bands for a specific communications protocol. In an aspect, modem 414-*a* can be multimode and be configured to support multiple operating networks and communications protocols. In an aspect, modem 414-*a* can control one or more components of STA 115 (e.g., RF front end 488-*a*, transceiver 402-*a*) to enable transmission and/or reception of signals from the network based on a specified modem configuration. In an aspect, the modem configuration can be based on the mode of the modem and the frequency band in use. In another aspect, the modem configuration can be based on STA configuration information associated with STA 115 as provided by the network during cell selection and/or cell reselection.

In some examples, the communication management component 405-*a* may include a packet decoding component 410-*a* configured decode at least a portion of a preamble of the packet to determine whether the packet is sent by a member of an OBSS as described with reference to FIG. 3. The communication management component 405-*a* may further include a backoff operation management component 415-*a* for deferring the backoff operation (e.g., stopping the backoff time interval or time period) in response to a start of the decoding. In some examples, the backoff operation management component 415-*a* may further be configured to resume the backoff operation in response to the determination that the packet is sent by the member of the OBSS. The backoff operation may be resumed before an end of the packet. For example, the backoff operation management component 415-*a* may resume the backoff operation prior to expiration of the time period reserved for the OBSS packet by the NAV. The backoff operation management component 415-*a* may be configured to modify or adjust when to resume the backoff operation and/or the time remaining in the backoff operation. For example, the backoff operation management component 415-*a* may be configured to reduce the time remaining in the backoff operation based at least in part on a time it took to decode the at least a portion of the preamble or a duration of the preamble. Moreover, the backoff operation management component 415-*a* may be configured to add a pseudo-random time period to a remaining time of the backoff operation to avoid collisions. The remaining time of the backoff operation may refer to a time left to complete the backoff operation when the backoff operation is deferred or pause in response to the start of the decoding of the preamble of the packet.

Additionally or alternatively, the communication management component 405 may include a traffic scheduling component 420-*a* for transmitting, by the device (STA or AP), a signal after expiration of the backoff operation. In some examples, the signal may be transmitted before the end of the OBSS packet frame. Specifically, in some examples, the traffic scheduling component 420-*a* may generate a signal (e.g., data packet or control signal) pending transmission, and the forward the generated signal to the transceiver 60 to be modulated onto the wireless channel or medium. Alternatively, in some examples, the signal may be transmitted after the end of the OBSS packet frame. The traffic scheduling component 420 may configure the transceiver 60 to wait a designated time period (defined by one or more methods discussed with reference to FIG. 3) prior to attempting to access the channel or medium on the communications link 125.

Figure 4B:
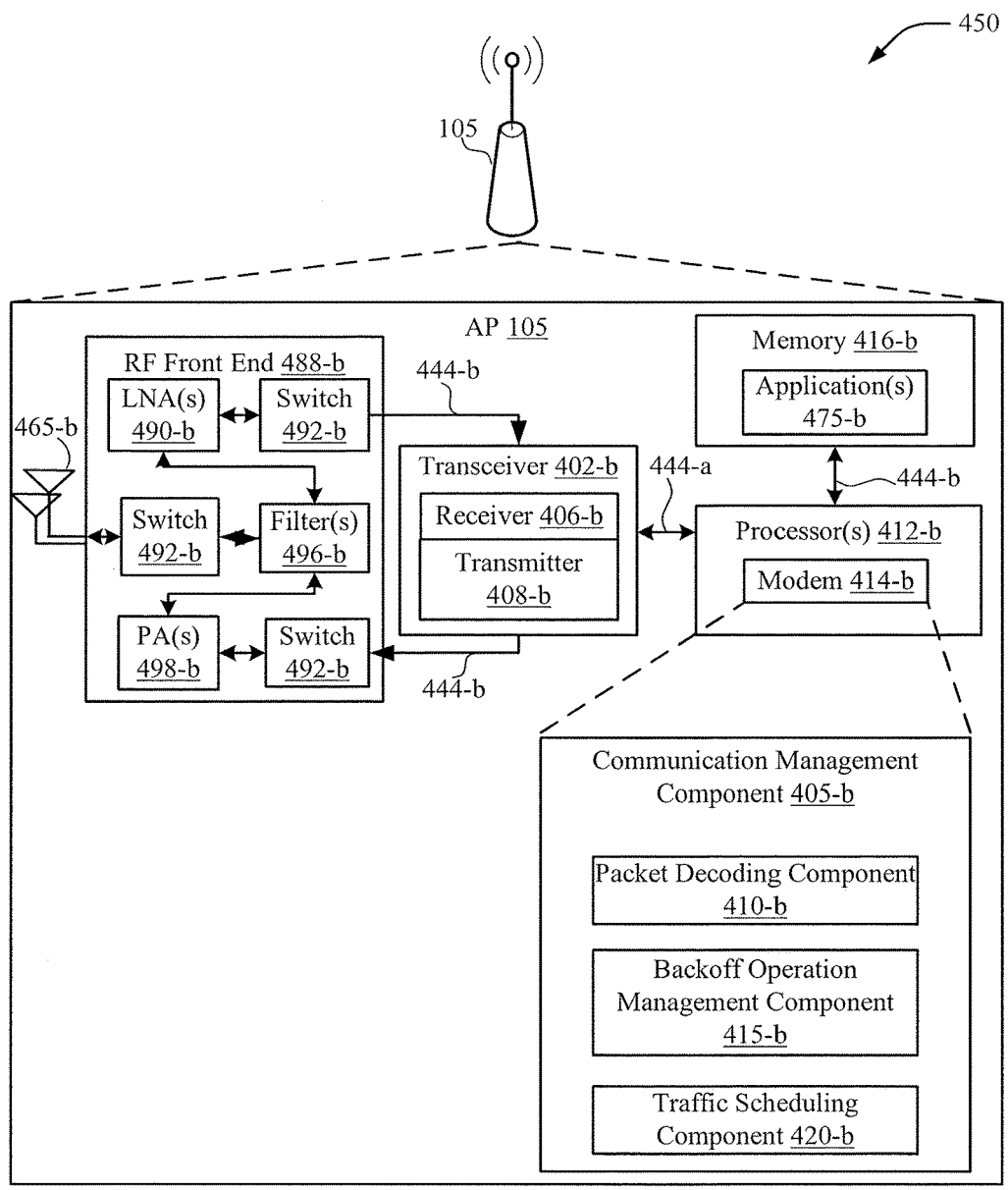

FIG. 4B describes hardware components and subcomponents of the AP 105 for implementing one or more methods (e.g., methods 300 and 500) described herein in accordance with various aspects of the present disclosure. For example, one example of an implementation of AP 105 may include a variety of components, some of which have already been described above, but including components such as one or more processors 412-*b* and memory 414-*b* and transceiver 402-*b* in communication via one or more buses 444-*b*, which may operate in conjunction with communication management component 405-*b* to enable one or more of the functions described herein related to including one or more methods of the present disclosure. In some aspects, the components of the AP 105 may be similar in functionality to those of AP 105, and for the sake of brevity, each of the various components and subcomponents that may be similar in functionality are not repeated herein.

Figure 5:
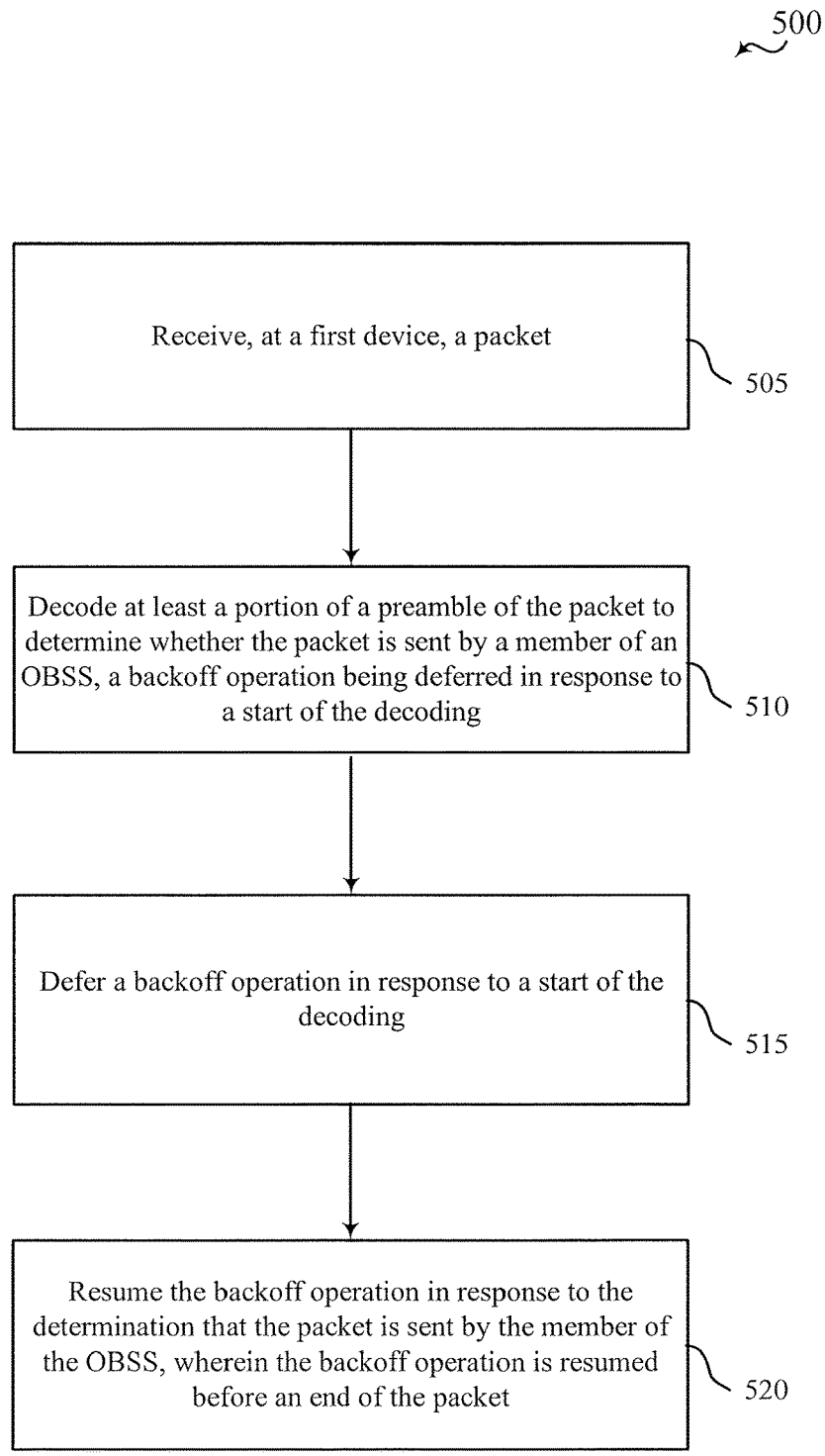
FIG. 5 illustrates an example of a flowchart that shows aspects for reducing delay in traffic transmission in an OBSS environment in accordance with various aspects of the present disclosure.

FIG. 5 is a flowchart conceptually illustrating an example of a method 500 of wireless communication, in accordance with aspects of the present disclosure. For clarity, the method 500 is described below with reference to AP 105 and/or STA 115 described with reference to FIG. 1.

At 505, the method 500 may include receiving, at a first device, a packet. In some examples, the first device may be an example of an AP 105 and/or STA 115. Additionally or alternatively, the packet may be a data packet or control packet. Aspects of 505 may be performed by transceiver 402 described with reference to FIGS. 4A and 4B.

At 510, the method 500 may include decoding at least a portion of a preamble of the packet to determine whether the packet is sent by a member of an OBSS. In some examples. In some examples, the first device may determine whether a transmission is from the same BSS as the first device or from an OBSS based on color code/information included in the preamble of the packet that identifies the BSS from which the packets originated. Aspects of 510 may be performed by packet decoding component 410 described with reference to FIGS. 4A and 4B.

At, 515, the method 500 may include deferring a backoff operation in response to a start of the decoding. In some aspects, deferring the backoff operation may include stopping or pausing the backoff counter from decrementing during the time that the receiving device decodes at least a portion of the preamble. Aspects of block 515 may be performed by the backoff operation management component 415 described with reference to FIGS. 4A and 4B.

At 520, the method 500 may include resuming the backoff operation in response to the determination that the packet is sent by the member of the OBSS, and that one or more reuse conditions (e.g., RSSI is below a threshold) are met. In some aspects, the backoff operation may be resumed before an end of the packet. In other words, the first device, upon determining that the packet is sent by the member of the OBSS and that certain reuse criteria are met, may ignore the remaining portion of the OBSS packet, and thus choose to not honor the NAV associated with the OBSS packet when resuming the backoff operation. Aspects of 520 may be performed by traffic scheduling component 420 described with reference to FIGS. 4A and 4B.

The apparatus and methods have been described in the detailed description and illustrated in the accompanying drawings by various elements comprising blocks, modules, components, circuits, steps, processes, algorithms, and the like. These elements, or any portion thereof, either alone or in combinations with other elements and/or functions, may be implemented using electronic hardware, computer software, or any combination thereof. Whether such elements are implemented as hardware or software depends upon the particular application and design constraints imposed on the overall system. In an aspect, the term "component" as used herein may be one of the parts that make up a system and may be divided into other components.

By way of example, an element, or any portion of an element, or any combination of elements may be implemented with a "processing system" that includes one or more processors. A processor may include a general purpose processor, a digital signal processor (DSP), an application specific integrated circuit (ASIC), a field programmable gate array (FPGA) or other programmable logic component, discrete gate or transistor logic, discrete hardware components, or any combination thereof, or any other suitable component designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on transitory or non-transitory computer-readable medium. A non-transitory computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), static RAM (SRAM), dynamic RAM (DRAM), synchronous dynamic RAM (SDRAM); double date rate RAM (DDRAM), read only memory (ROM), programmable ROM (PROM), erasable PROM (EPROM), electrically erasable PROM (EEPROM), a general register, or any other suitable non-transitory medium for storing software.

The various interconnections within a processing system may be shown as buses or as single signal lines. Each of the buses may alternatively be a single signal line, and each of the single signal lines may alternatively be buses, and a single line or bus might represent any one or more of a myriad of physical or logical mechanisms for communication between elements. Any of the signals provided over various buses described herein may be time-multiplexed with other signals and provided over one or more common buses.

The various aspects of this disclosure are provided to enable one of ordinary skill in the art to practice the present invention. Various modifications to examples of implementations presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the examples of implementations described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for."

What is claimed is:

1. A method for wireless communication, comprising:
   receiving, at a first device, a packet;
   decoding at least a portion of a preamble of the packet to determine whether the packet is sent by a member of an overlapping basic service set (OBSS), wherein the decoding comprises:
      identifying a sequence in the preamble of the packet;
      determining whether the sequence matches a sequence for packets intended for members of a BSS associated with the first device; and
      determining that the packet is sent by the member of the OBSS in response to a determination that the match fails;
   deferring a backoff operation in response to a start of the decoding; and
   resuming the backoff operation in response to the determination that the packet is sent by the member of the OBSS, wherein the backoff operation is resumed before an end of the packet.

2. The method of claim 1, further comprising:
   transmitting, by the first device, a signal after expiration of the backoff operation.

3. The method of claim 1, wherein the backoff operation is resumed a frame spacing after the determination that the packet is sent by the member of the OBSS.

4. The method of claim 3, wherein the frame spacing is defined by an arbitration inter-frame spacing (AIFS).

5. The method of claim 3, wherein a value of the frame spacing when the backoff operation is resumed is shorter than a value defined by an AIFS.

6. The method of claim 5, wherein a value of the frame spacing and a value of the AIFS are based on an access class.

7. The method of claim 5, wherein a value of the frame spacing and a value of the AIFS are based on a type of data pending transmission.

8. The method of claim 7, wherein the message received at the first device identifies a different procedure for resuming the backoff operation than a procedure identified in a message received from the AP at a another device different from the first device.

9. The method of claim 3, wherein the frame spacing is set to zero to allow the backoff operation to resume without additional delay after the determination that the packet is sent by the member of the OBSS.

10. The method of claim 3, further comprising:
    adding a pseudo-random time period to the frame spacing in response to the determination that the packet is sent by the member of the OBSS, wherein resuming the backoff operation comprises resuming the backoff operation based on the frame spacing modified by the pseudo-random time period.

11. The method of claim 1, further comprising:
    reducing a remaining time of the backoff operation based at least in part on a time it took to decode the portion of the preamble or a duration of the preamble.

12. The method of claim 11, wherein the remaining time of the backoff operation is a time left to complete the backoff operation when the backoff operation is deferred in response to the start of the decoding.

13. The method of claim 1, further comprising:
    adding a pseudo-random time period to a remaining time of the backoff operation in response to the determination that the packet is sent by the member of the OBSS, wherein resuming the backoff operation comprises resuming the backoff operation based on the remaining time modified by the pseudo-random time period.

14. The method of claim 1, further comprising:
receiving, at the first device, a message from a second device identifying which procedure to use when resuming the backoff operation in response to the determination that the packet is sent by the member of the OBSS.

15. The method of claim 14, wherein the second device is an access point (AP), the method further comprising resuming the backoff operation based on the procedure identified in the message received from the AP.

16. The method of claim 1, wherein resuming the backoff operation comprises:
performing a clear channel assessment (CCA) procedure to determine whether a wireless medium is idle or busy until the end of the packet.

17. The method of claim 1, wherein resuming the backoff operation before the end of the packet comprises resuming the backoff operation before expiration of network allocation vector (NAV) associated with the OBSS packet.

18. An apparatus for wireless communication, comprising:
a processor; and
a memory coupled to the processor, wherein the memory includes instructions executable by the processor to:
receive, at a first device, a packet;
decode at least a portion of a preamble of the packet to determine whether the packet is sent by a member of an overlapping basic service set (OBSS) by further executing the instructions to:
identify a sequence in the preamble of the packet;
determine whether the sequence matches a sequence for packets intended for members of a BSS associated with the first device; and
determine that the packet is sent by the member of the OBSS in response to a determination that the match fails;
defer a backoff operation in response to a start of the decoding; and
resume the backoff operation in response to the determination that the packet is sent by the member of the OBSS, wherein the backoff operation is resumed before an end of the packet.

19. The apparatus of claim 18, wherein the instructions are further executable by the processor to:
transmit, by the first device, a signal after expiration of the backoff operation.

20. The apparatus of claim 18, wherein the backoff operation is resumed a frame spacing after the determination that the packet is sent by the member of the OBSS.

21. The apparatus of claim 20, wherein the frame spacing is defined by an arbitration inter-frame spacing (AIFS).

22. The apparatus of claim 20, wherein a value of the frame when the backoff operation is resumed is shorter than a value defined by an AIFS.

23. The apparatus of claim 22, wherein a value of the frame spacing and a value of the AIFS are based on an access class.

24. The apparatus of claim 22, wherein a value of the frame spacing and a value of the AIFS are based on a type of data pending transmission.

25. The apparatus of claim 20, wherein the frame spacing is set to zero to allow the backoff operation to resume without additional delay after the determination that the packet is sent by the member of the OBSS.

26. The apparatus of claim 20, wherein the instructions are further executable by the processor to:
add a pseudo-random time period to the frame spacing in response to the determination that the packet is sent by the member of the OBSS, wherein resuming the backoff operation comprises resuming the backoff operation based on the frame spacing modified by the pseudo-random time period.

27. The apparatus of claim 18, wherein the instructions are further executable by the processor to:
reduce a remaining time of the backoff operation based at least in part on a time it took to decode the portion of the preamble or a duration of the preamble.

28. The apparatus of claim 27, wherein the remaining time of the backoff operation is a time left to complete the backoff operation when the backoff operation is deferred in response to the start of the decoding.

29. The apparatus of claim 18, wherein the instructions are further executable by the processor to:
add a pseudo-random time period to a remaining time of the backoff operation in response to the determination that the packet is sent by the member of the OBSS, wherein resuming the backoff operation comprises resuming the backoff operation based on the remaining time modified by the pseudo-random time period.

30. The apparatus of claim 18, wherein the instructions are further executable by the processor to:
receive a message from a second device identifying which procedure to use when resuming the backoff operation in response to the determination that the packet is sent by the member of the OBSS.

31. The apparatus of claim 30, wherein:
the second device is an access point (AP), and
the instructions are further executable by the processor to resume the backoff operation based on the procedure identified in the message received from the AP.

32. The apparatus of claim 31, wherein the message received at the first device identifies a different procedure for resuming the backoff operation than a procedure identified in a message received from the AP at a another device different from the first device.

33. The apparatus of claim 18, wherein the instructions for resuming the backoff operation are further executable by the processor to:
perform a clear channel assessment (CCA) procedure to determine whether a wireless medium is idle or busy until the end of the packet.

34. The apparatus of claim 18, wherein the instructions are further executable by the processor to resume the backoff operation before expiration of a network allocation vector (NAV) associated with the OBSS packet.

35. An apparatus for wireless communication, comprising:
means for receiving, at a first device, a packet;
means for decoding at least a portion of a preamble of the packet to determine whether the packet is sent by a member of an overlapping basic service set (OBSS), wherein the means for decoding comprises:
means for identifying a sequence in the preamble of the packet;
means for determining whether the sequence matches a sequence for packets intended for members of a BSS associated with the first device; and means for determining that the packet is sent by the member of the OBSS in response to a determination that the match fails;

means for deferring a backoff operation in response to a start of the decoding; and means for resuming the backoff operation in response to the determination that the packet is sent by the member of the OBSS, wherein the backoff operation is resumed before an end of the packet.

36. A non-transitory computer-readable medium storing code executable by a processor for wireless communication, the code comprising:

code for receiving, at a first device, a packet;

code for decoding at least a portion of a preamble of the packet to determine whether the packet is sent by a member of an overlapping basic service set (OBSS), wherein the code for decoding comprises:

code for identifying a sequence in the preamble of the packet;

code for determining whether the sequence matches a sequence for packets intended for members of a BSS associated with the first device; and code for determining that the packet is sent by the member of the OBSS in response to a determination that the match fails;

code for deferring a backoff operation in response to a start of the decoding; and code for resuming the backoff operation in response to a determination that the packet is sent by the member of the OBSS, wherein the backoff operation is resumed before an end of the packet.

\* \* \* \* \*